Patented July 21, 1931

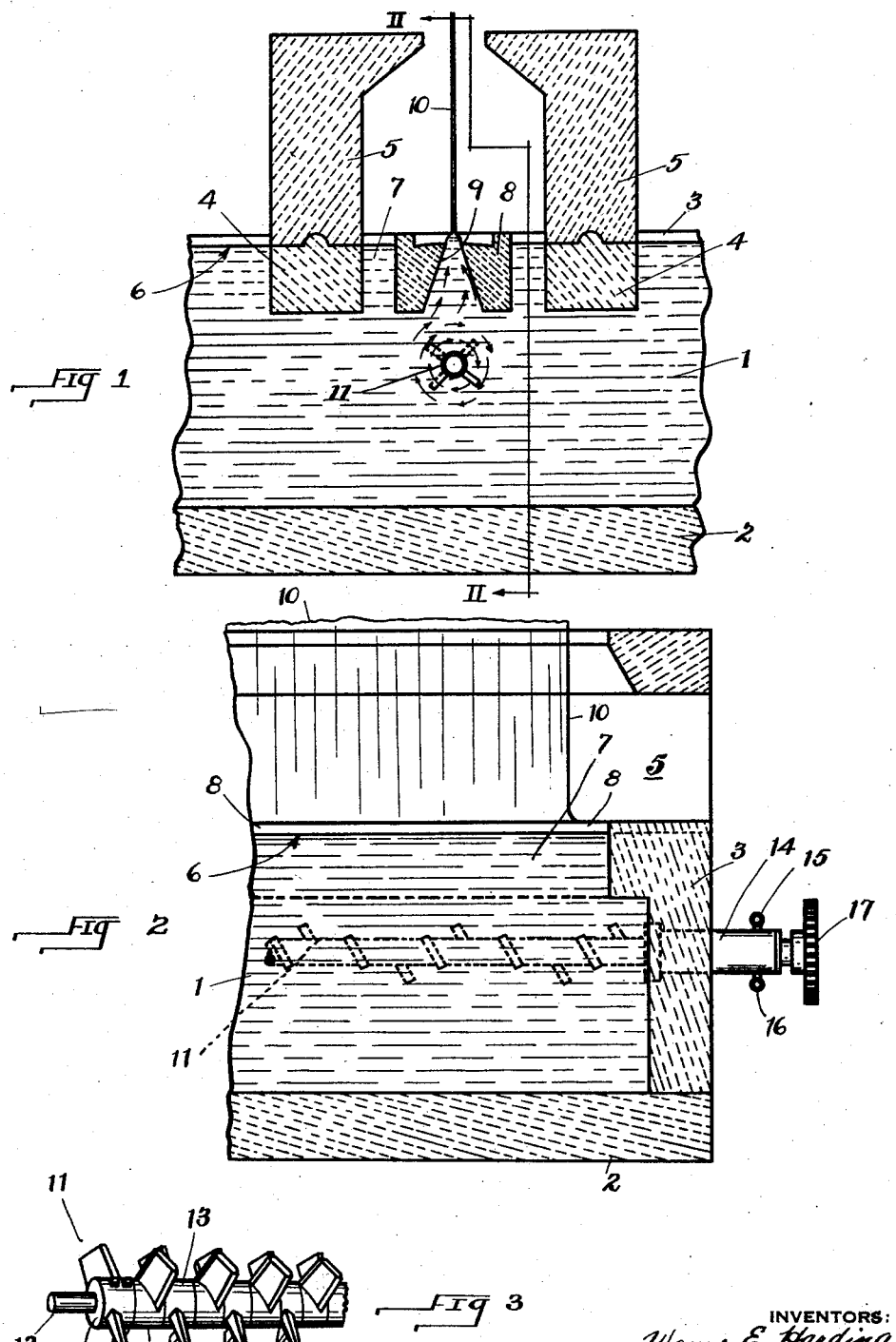

1,815,473

UNITED STATES PATENT OFFICE

WAYNE E. HARDING AND CECIL C. WEEKLEY, OF FORT SMITH, ARKANSAS, ASSIGNORS TO HARDING GLASS COMPANY, A CORPORATION OF WEST VIRGINIA

METHOD OF AND APPARATUS FOR DRAWING SHEET GLASS

Application filed April 29, 1930. Serial No. 448,230.

The present invention consists in certain new and useful improvements both in method and apparatus employed in the manufacture of sheet glass by drawing the same directly from a body of molten glass, or in some cases by forcing the glass through a slot formed adjacent to the surface of the molten glass body and then drawing the sheet from the glass as thus extruded through the slot. For the purpose of description only, the invention will be described in its preferred form as applied to the second method of sheet forming above named, involving combined extrusion and drawing, as exemplified in the well-known Fourcault procedure.

In the manufacture of sheets or plates of glass according to the Fourcault process, a glass furnace is provided with a drawing compartment in which a bath of molten glass is maintained under controlled temperature. In the upper body of the bath of molten glass a drawing block is immersed, and through this block the glass is slowly extruded to form a sheet or plate of glass, which is then drawn upwardly by any suitable means. There is a tendency for the bath of molten glass to segregate in streaks or layers, and for each of such layers to assume a consistency and temperature at variance with the other layers. Uniformity of temperature and homogeneity of the bath are destroyed by such segregation, and, needless to say, the sheets of glass which are drawn from a so constituted bath are of slightly varying thickness in different parts of the sheet, and consequently of varying coefficients of refraction, so that distortion of vision through the finished pane of a glass is frequent, and sometimes very great. The object of the present invention is to render and maintain the molten bath as homogeneous as possible, and to provide novel means for so doing.

In the accompanying drawings Figure 1 is a fragmentary view in vertical section of a glass drawing compartment of the Fourcault type, showing beneath the line of draw a stirring device embodying our invention. Figure 2 is a like view, at right angles to that of Figure 1, and on the line II—II of that figure. Figure 3 is a fragmentary perspective view of a stirring or agitating device which may be employed in the practice of our invention.

The reference numeral 1 indicates a bath of molten glass which is contained in the drawing compartment of a glass furnace. We are not immediately concerned with either the furnace or the structure of the drawing compartment. Accordingly, the furnace has not been illustrated, and the drawing compartment, having a floor 2 and side walls 3 of suitable refractory material, has merely been indicated fragmentarily. Extending across the drawing compartment are two blocks 4, and upwardly of each of these blocks 4 a curtain block 5 is supported. It will be noted that one pair of blocks 4, 5 is separated from the other pair, and that the blocks 4 so extend below the surface 6 of the bath of glass that a more or less segregated pool 7 of glass is formed between them. Extending longitudinally with the blocks 4, and located between them, as shown in Figure 1, is a drawing block 8. An elongate drawing orifice 9 is formed within the drawing block, and the drawing block is immersed in the bath to cause sufficient molten glass to enter the drawing orifice. In the customary manner a sheet 10 of glass is formed by extruding and drawing the glass sheet continuously upwardly from the orifice 9. The usual bait and rollers for drawing the glass sheet upwardly are not illustrated.

To maintain the glass within the drawing orifice 9 in a homogeneous condition, and at a constant and uniform temperature, has long been a problem in the art. We find that an agitator wholly submerged in the body of molten glass may be adapted to stir constantly the bath of glass, and to maintain the glass within the drawing block in the desired uniform and homogeneous condition. Advantageously, the agitator may comprise a rotary paddle member 11, rotatably supported in the body of the bath below and coextensive in length with the line of the draw. An efficient agitator, or what we call a homogenator, is shown fragmentarily in Figure 3. It comprises a shaft 12 upon which there is secured a plurality of paddle members 13, which paddle members are formed of clay, or other composition which is capable of withstanding the destructive action of the molten glass. The agitator is journaled in the opposed side walls 3 of the drawing compartment; water-cooled bearings (14) may be employed in this connection. An inlet pipe 16 and an outlet pipe 15 serve to admit and discharge the current of cooling water. A gear 17 is secured to the shaft of the agitator, and is conveniently connected to a source of rotation for suitably moving the agitator 11.

In Figure 1 the arrows indicate the movement of the bath during actuation of the "homogenator" 11. It will be noted that the "homogenator" lies centrally of and below the drawing orifice 9. In practicing our invention it has been found that the glass entering the drawing orifice is homogeneous, and, due to the swirling of the bath effected by the "homogenator", the glass within the drawing block is maintained in the desired uniform condition. The sheets or plates of glass which are drawn from the bath are found to have better optical properties than the window glass which is manufactured according to present day practices.

As has been stated above, the invention is not limited to its practice in connection with or as an appendage to the Fourcault method and structure, but it may be applied to any apparatus or method involving the drawing of a sheet of glass, either intermittently or continuously, from a body of molten glass, it only being necessary that the agitator, or so-called homogenator, may be wholly submerged in the body of molten glass, and preferably be coextensive in length with the line of draw.

We claim as our invention:

1. In apparatus for the manufacture of sheet glass by drawing the same upwardly from a body of molten glass, an agitator rotatably mounted within the molten glass beneath the line of draw of the sheet, and means for rotating the agitator.

2. In apparatus for the manufacture of sheet glass by drawing the same upwardly from a bath of molten glass, the combination with a compartment containing the molten bath, a drawing block arranged in said compartment and having a drawing slot, means for drawing the sheet of glass upwardly through said slot, an agitator rotatably mounted in the glass bath beneath said slot and coextensive in length with the width of the sheet being drawn, and means for rotating the agitator.

3. The method of manufacture of sheet glass which consists in drawing the sheet upwardly from a bath of molten glass and simultaneously stirring internally the molten bath beneath the line of formation of the sheet.

4. In apparatus for the manufacture of sheet glass, the combination with a glass-drawing compartment including a drawing block immersed in a bath of molten glass, of a homogenator immersed in the molten glass below the drawing block, which homogenator extends with the length of said drawing block and is adapted for movement to render and maintain the molten glass within said drawing block in a homogeneous condition.

5. In apparatus for the manufacture of sheet glass by drawing the same upwardly from a body of molten glass, a rotatable agitator wholly submerged in the body of molten glass, and means for rotating the agitator.

In testimony whereof we have hereunto set our hands.

WAYNE E. HARDING.
CECIL C. WEEKLEY.